July 12, 1966  D. KELLERMAN  3,260,906
WOUND CAPACITOR AND METHOD OF MAKING THE SAME
Filed Jan. 17, 1964  2 Sheets-Sheet 1

INVENTOR.
DAVID KELLERMAN
BY Don Finkelstein
ATTORNEY

July 12, 1966  D. KELLERMAN  3,260,906
WOUND CAPACITOR AND METHOD OF MAKING THE SAME
Filed Jan. 17, 1964  2 Sheets-Sheet 2
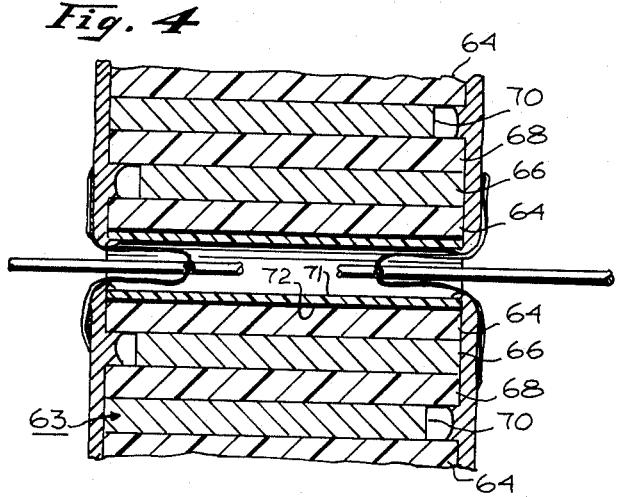
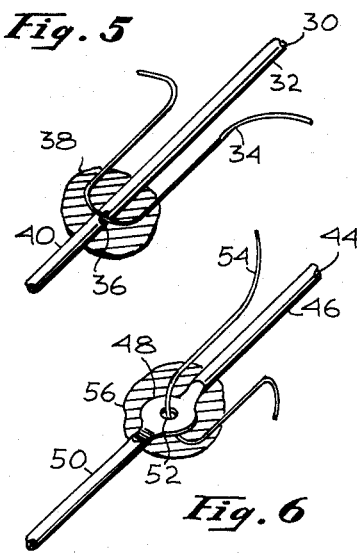
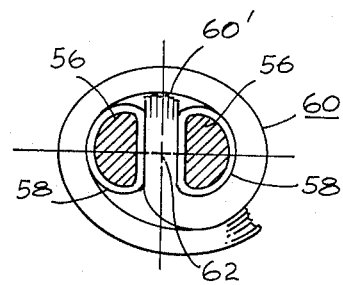
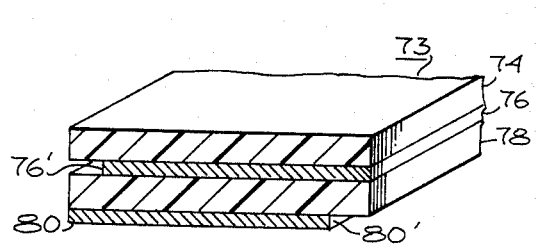
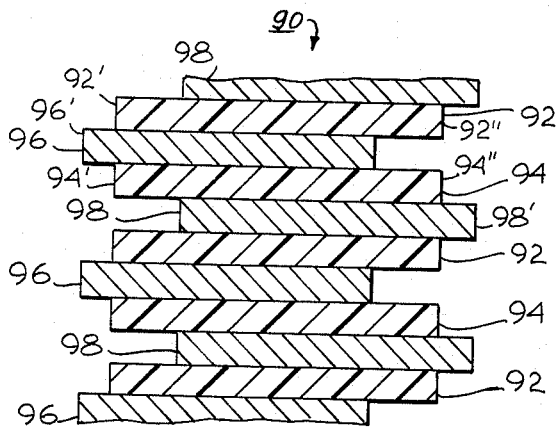
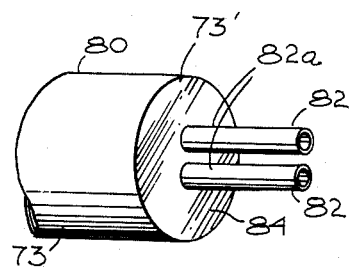
INVENTOR.
DAVID KELLERMAN
BY Don Finkelstein
ATTORNEY

United States Patent Office

3,260,906
Patented July 12, 1966

3,260,906
WOUND CAPACITOR AND METHOD OF MAKING THE SAME
David Kellerman, 1485 S. Cardiff St., Los Angeles, Calif.
Filed Jan. 17, 1964, Ser. No. 338,351
11 Claims. (Cl. 317—260)

This invention relates to the capacitor art and more particularly to an improved film wound capacitor.

In many applications it is necessary to provide miniaturized or micro-miniaturized capacitors having comparatively large capacitances that are not only vibration and shock resistant but also exhibit a high degree of stability throughout a wide range of operating temperatures. Thus, in some applications, such capacitors may be required to withstand shock loadings on the order of 30,000 "g's" without substantial change in the electrical properties or damage to the physical connection of the leads to the capacitor. Also, such capacitors may be exposed for operation at temperatures ranging from minus 100° F. to plus 350° F., for example. Over this wide temperature range it is desired that the capacitance value of the capacitor remain substantially constant and also that the capacitor remain physically intact and completely operative throughout.

Prior wound capacitors have not always been able to meet these objectives. For example, prior "hollow core" wound capacitors utilizing a flexible multilayer winding consisting of alternate layers of conductive and dielectric materials were often wound directly upon a pair of adjacent mandrels and when the desired thickness of winding was achieved, were removed from the mandrels thereby leaving hollow axial apertures therethrough. In removing such a wound capacitor from the mandrels, the innermost layer adjacent to the mandrel was often damaged, resulting in a high rejection rate of such wound capacitors. To alleviate such a high rejection rate, the capacitors were not wound as tightly as they could be thereby increasing the size of such a capacitor for a given capacitance value. Also, when such capacitors were exposed to operation over a wide range of temperatures, it was found that differential expansion of the winding tended to collapse the winding into the axial aperture, thereby loosening the winding and substantially changing the capacitance value over the temperature range. Similarly, when subjected to shock loadings or vibration, an analogous effect was observed in that the unsupported axial aperture tended to close, thereby loosening up the windings and thereby changing the capacitance value. Further, the physical connection of the leads to such capacitors often comprised merely a direct soldered connection to the edges of the capacitor and such connections were often subject to failure when subjected to shock, vibration or temperature differentials. "Solid core" wound capacitors utilized in the past incorporated a solid cylindrical core which added weight and bulk to such capacitors, thereby limiting the degree of micro-miniaturization obtainable.

Accordingly, it is an object of applicant's invention to provide an improved capacitor.

It is another object of applicant's invention to provide a capacitor adapted for miniaturization and micro-miniaturization.

It is another object of applicant's invention to provide an improved wound capacitor that is shock resistant and highly stable.

The above and other objects of applicant's invention are achieved in one embodiment of applicant's invention, by a multi-layer film member having alternate layers of conductive material and dielectric material spirally wound around a pair of adjacent tubular, flexible, dielectric core members. The core members, may, for example, be inserted over mandrels and then the mandrels rotated about a common axis to wind the multi-layer film member about the core members a preselected number of turns to provide the capacitance and voltage rating desired. The core members, with the multi-layer film member wound therearound, are then removed from the mandrels.

A metallic coating is applied along each of the peripheral edges of the multi-layers film member. On a first edge this coating interconnects a first layer of the conductive material to provide a first capacitor electrode, and similarly, the coating on the opposite peripheral edge of the multi-layer film member interconnects a second layer of conductive material to define a second capacitor electrode.

Capacitor leads are then connected to the first and the second capacitor electrodes and, in the preferred embodiment of this invention, each of the leads extends a preselected distance into one or the other of the tubular core members. A flexible wire member is coupled to each of the leads on the portion contained within the tubular core member. The flexible wire coupled to the first capacitor lead is soldered to the metallic coating of the first capacitor electrode and the flexible wire coupled to the second capacitor lead is soldered to the metallic coating of the second capacitor electrode. Portions of the capacitor leads contained within the tubular core members are formed to a size approximately the same as the inside diameter of the core member to thereby frictionally engage the walls thereof. Since the core member is flexible, this frictional engagement yieldingly restrains the capacitor leads therein.

Thus, the provision of the core members allows the capacitor to be removed from the mandrels without damage to the layers of conductive material forming the capacitor electrodes and yet still be wound comparatively tightly to provide a high capacitance and high voltage resistance in comparatively small physical volume. The particular, preferred type of capacitor lead connection provides greater physical strength by the axial alignment of the capacitor leads themselves and the energy absorption by the core members in response to axially directed loads on the capacitor leads.

The above and other objects are more fully described in the following detailed description taken together with the accompanying drawings in which similar reference characters refer to similar elements throughout and wherein:

FIGURE 4 is a sectional view of another embodiment of applicant's invention;

FIGURES 5 and 6 illustrate capacitor lead connections according to applicant's invention;

FIGURES 7, 8 and 9 illustrate another embodiment of applicant's invention; and

FIGURE 10 illustrates a flexible multi-layer film useful in the practice of applicant's invention.

Figure 1:
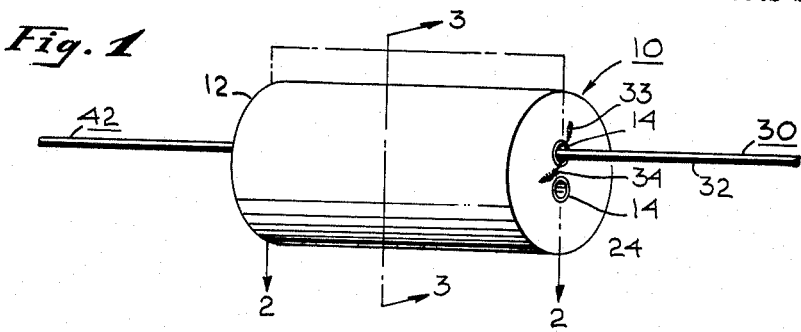
FIGURE 1 is a perspective view of one embodiment of applicant's invention.
Figure 2:
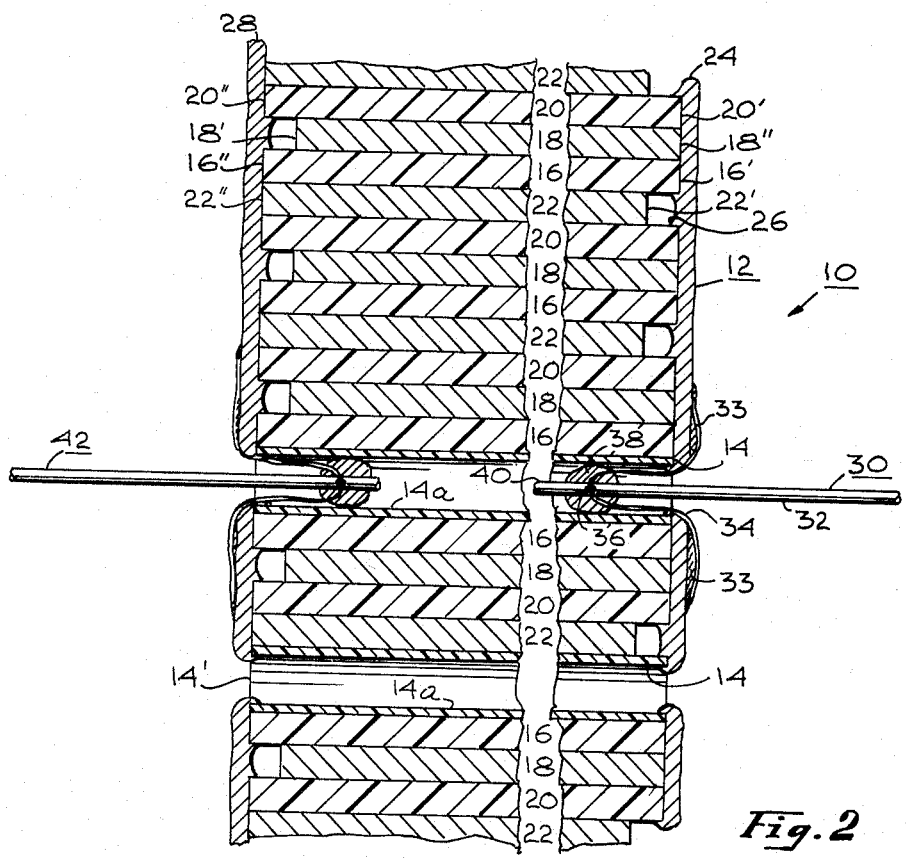
FIGURE 2 is a partial sectional view along the line 2—2 of FIGURE 1.
Figure 3:
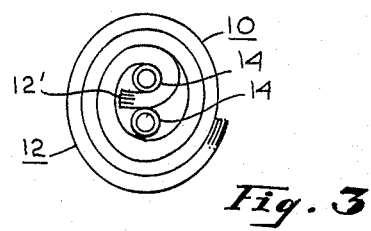
FIGURE 3 is a partial sectional view along the line 3—3 of FIGURE 1.

Referring now to FIGURES 1, 2 and 3, which illustrate the structure comprising one embodiment of applicant's invention, there is shown a capacitor, generally designated 10, according to the principles of applicant's invention herein. As shown thereon, the capacitor 10 comprises a flexible multi-layer film member 12 wound around a pair of tubular, dielectric, flexible core members 14. The multi-layered film member 12 comprises alternate layers of conducting material and dielectric material. Thus, the multi-layered film member 12 comprises a first dielectric layer 16, a first conducting layer 18, a second dielectric layer 20, and a second conducting layer 22. In the preferred embodiment of applicant's invention a first peripheral edge 16′ and a first peripheral edge 20′ of the first dielectric layer 16 and the second dielectric layer 20, respectively, are substantially coplanar, as are the second peripheral edges 16″ and 20″, respectively, thereof.

For reasons discussed below in detail, it is preferred that a first peripheral edge 18′ of the first conducting layer 18 be spaced inwardly a preselected distance from the coplanar second edges 16″ and 20″ of first dielectric layer 16 and second dielectric layer 20, respectively. The second peripheral edge 18″ of the first conducting layer 18, is substantially coplanar with the first edges 16′ and 20′ of first dielectric layer 16 and second dielectric layer 20, respectively.

Similarly, a first peripheral edge 22′ of second conducting layer 22, is spaced inwardly a preselected distance from the coplanar first edges 16′ and 20′ of first dielectric layer 16 and second dielectric layer 20, respectively, and the second peripheral edge 22″ of second conducting layer 22 is substantially coplanar with the coplanar second edges 16″ and 20″ of first dielectric layer 16 and second dielectric layer 20, respectively.

The first and second dielectric layers 16 and 20 may comprise thin sheets of Teflon, Mylar, or other similar flexible, plastic dielectric materials. The first conducting layer 18 and second conducting layer 22 may comprise thin layers of metallic foil. The total thickness of the two dielectric layers 16 and 20 and the two conducting layers 18 and 22 which, together, comprise the flexible, multi-layered film member 12 is comparatively small and may be, for example, on the order of 0.0005 inch to 0.005 inch thick. Thus, comparatively high capacitance values and comparatively high voltage values may be obtained according to the principles of applicant's invention herein in a comparatively small physical size capacitor by providing the desired number of turns of the multi-layered film member 12 about the pair of tubular core members 14.

The tubular core members 14 have a preselected internal diameter defined by their internal wall portions 14a and the tubular core members 14 are preferably somewhat flexible and yieldable. Thus, applicant has found that comparatively small diameter Teflon tubing, Mylar tubing, glass fiber reinforced resin plastic tubing, and similar such dielectric tubings are satisfactory for utilization as the tubular core members 14. For the smaller size of applicant's improved capacitors, applicant has found that a wall thickness of the tubular core members 14 may be on the order of 0.006 inch to 0.007 inch and still provide satisfactory operation. The presence of the tubular core members 14 in applicant's improved capacitor prevents the multi-layer film member 12 from collapsing into the axial space that was generally left in prior hollow core wound capacitors by the mandrel which tended to loosen the winding of the multi-layer film member 12 and thereby change the capacitance value thereof. The tubular core members 14 also provide other functions as described below in greater detail.

The second edge 18″ of the first conducting layer 18, as spirally wound in the capacitor 10, is conductively coupled by an electrically conductive coating 24 applied thereon. Electrically conductive coating 24 may be applied by solder coating the peripheral edge of the capacitor 10, by metal spraying, or by other known techniques. When the electrically conductive layer 24 is applied to the second edge 18″ of the first conductive layer 18, it must be insured that no contact therewith is made with the second conducting layer 22. Therefore, as noted above, the first edge 22′ of the second conductive layer 22 is spaced inwardly from the second edge 18″ of the first conductive layer 18. Thus, some of the metal spray may flow into the space, as shown at 26, but the inward spacing of the first edge 22′ of the second conducting layer 22 is sufficiently great so that no electrically conducting connection with first conducting layer 18 is made therewith.

Similarly, an electrically conductive coating 28 is applied along the opposite peripheral edges of the capacitor 10 to electrically couple the second edges 22″ of the second conducting member 22 without electrical connection with the first edge 18′ of the first conducting layer 18 therewith. Thus, the electrically conductive coating 24, together with the first conducting layer 18 comprise a first capacitor electrode of the capacitor 10 and the electrically conductor coating 28, together with the second electrically conducting layer 22, comprise the second capacitor electrode of the capacitor 10.

In some applications of applicant's improved capacitor, applicant has found that it may be desirable to have the peripheral edges of the conducting layers of the flexible film member that are coated with the electrically conductive coating to provide the capacitor leads extend beyond the peripheral edges of the dielectric layers to provide more complete contact with the conductive coating. This is illustrated in FIGURE 10 is which a flexible multi-layer film member 90 is comprised of alternate layers 92 and 94 of dielectric material and alternate layers 96 and 98 of conducting material.

A peripheral edge 96′ of conducting layer 96 extends beyond first peripheral edges 92′ and 94′ of dielectric layers 92 and 94, respectively, so that when an electrically conductive coating is applied thereon greater area contact is available for connection thereto. Similarly the peripheral edge 98′ of conducting layer 98 extends beyond the second peripheral edges 92″ and 94″ of dielectric layers 92 and 94, respectively. In either event, the peripheral edge portions of the conducting layers utilized for connection to the conductive coating may be considered substantially coextensive or coplanar with the peripheral edges of the dielectric layers, whether in the form shown on FIGURES 2, 4, and 8, or the form shown on FIGURE 10.

Applicant's improved capacitor herein also contemplates the provision of an improved arrangement for attaching the leads to the capacitor. One form of this improved capacitor lead arrangement is illustrated in FIGURE 2 and the structure thereof shown in greater detail on FIGURE 5. As shown, there is a capacitor lead assembly 30 comprising a lead 32 coupled to a flexible wire 34. The diameter of the flexible wire 34 is small in comparison with the diameter of the lead 32, and therefore, the flexible wire 34 has a higher degree of flexibility. In this embodiment, the flexible wire 34 is coupled to the lead 32 by spot welding, as at 36, and then the entire area of the lead 32 adjacent the weld 36 and adjacent portions of wire 34 are surrounded by a solder coat 38 to a preselected thickness thereof. The thickness of the solder coat 38 is selected to provide a snug fit with the internal wall portions 14a defining the inside diameter of the tubular core member 14 and frictionally engages the wall portions 14a. The flexible wire 34 is soldered as at 33 on FIGURE 2, to the electrically conductive coating 24 to provide electrical continuity from the lead 32 to the first capacitor electrode. The lead 32 has a portion 40, to which the wire 34 is connected, that is, positioned inside the tubular core member 14, as shown in FIGURE 2. The depth to which the portion 40 is inserted into the tubular core member 14 is such that the flexible wire 34 is not put under tension but is provided with a preselected amount of "slack" therein. Thus, axially directed forces on the lead 32 are absorbed by the frictional engagement of the solder coat 38 with the internal wall portions 14a of the tubular core member 14 and resisted thereby to yieldingly restrain the lead 32 from axial movement. Therefore, there are generally no axial forces imposed upon the flexible wire 34, which is thus not subjected to strains which would tend to break the solder connection to the first capacitor electrode.

The frictional engagement of the solder coat 38 with the wall portions 14a of the tubular core member 14 also tends to resist any torsional loadings about the long axis of the lead 32 to thus maintain the integrity of the flexible wire 34 and the connection thereof to the first capacitor electrode. A second capacitor lead 42 is fabricated substantially similarly to the first capacitor lead assembly 30 and provides electrical connection to the second capacitor electrode described above. It will be appreciated, of course, that the capacitor lead assembly 30 must not be inserted so far into the tubular core member 14 that contact is made with the second capacitor lead assembly 42. Alternatively, of course, the capacitor lead assembly 42 may be inserted in the other of the tubular core members 14 as at 14' to eliminate any possibility of such inadvertent connection.

This particular capacitor lead connection could not be utilized with prior wound capacitors since, in the absence of tubular core members 14, there could be shorting of the capacitor lead assemblies 30 and 42 with the unprotected interior surfaces of the conducting layers of the flexible film 12.

Similarly, the frictional engagement of the solder coat 38 with the interior wall portions 14a of the tubular core member 14 provides a high degree of shock resistance for applicant's improved capacitor since any shock loading is transmitted directly to the tightly wound main body of the capacitor 10 through the core members 14 and does not tend to pull the capacitor leads away from connection with the capacitor electrodes.

FIGURE 6 illustrates another form of capacitor lead assembly that may be utilized in applicant's improved capacitor 10. As shown in FIGURE 6, a capacitor lead assembly 44 comprises a capacitor lead 46 having a flattened portion 48 adjacent to an end portion 50 thereof. An aperture 52 is provided through the flattened portion 48 and a flexible wire 54, which is similar to the flexible wire 34 illustrated on FIGURE 5 and FIGURE 2, is positioned through the aperture 52 and, if desired, a solder coating 56 surrounding the flattened portion 48 and the connection of the flexible wire 54 therewith may be provided. Either the size of the solder coating 56 or the size of the flattened portion 48 may be selected to provide frictional engagement with the interior wall portions 14a of the tubular core member 14 to yieldingly restrain the capacitor lead assembly 44 therein.

It will be appreciated that other similar arrangements for providing connections between the capacitor electrodes and the leads in applicant's improved capacitor may be utilized to provide the improved high strength, shock resistant capacitor lead connections as above described.

As can be seen from FIGURE 3, in manufacturing applicant's improved capacitor, an end 12' of the flexible film member 12 is first inserted between the pair of tubular core members 14 and then spirally wrapped therearound a preselected number of turns to provide the desired capacitance and voltage resistance. Frictional engagement of the end portion 12', as well as the first layer of winding, with the tubular dielectric core members 14 has proven to be satisfactory to wind the capacitor 10 as tightly as desired, with the flexibility of the tubular core members 14 tending to absorb any stresses that might be present in the first few layers of winding.

Since, in the embodiment shown on FIGURES 1, 2, and 3, the pair of tubular dielectric core members 14 are utilized, it will be appreciated that the capacitor leads may be placed in separate core members, as described above, or, if desired, may be placed in the same core member as shown on FIGURE 2. If placed in separate core members any possibility of shorting directly between the capacitor leads is thereby eliminated. It will be appreciated that when the capacitor 10 is removed from the mandrels (not shown), on which the core members are placed in manufacturing the capacitor, the interior wall portions 14a of the tubular core members 14 slide along the mandrels during removal therefrom and thereby protect the interior windings of the flexible multi-layer film member 12 from damage.

While, as shown in FIGURES 1, 2 and 3, cylindrical mandrels were utilized in the fabrication of this embodiment of applicant's improved capacitor, it will be appreciated that shapes other than cylindrical could equally well be utilized. Thus, as shown in FIGURE 7, "D" shaped mandrels 56 may be utilized and tubular core members 58, which may be similar to tubular core members 14, inserted thereon. An end 60' of a flexible film member 60, which may be similar to the flexible film member 12, is inserted between the flat faces of the "D" shaped mandrels 56 and then the mandrels rotated about a common center 62 to wind the flexible film member 60 thereabout a preselected number of turns. Similarly, many other shaped mandrels could equally well be utilized in the practice of the fabrication of the improved capacitor according to applicant's invention herein.

As noted above, the frictional engagement of the end 12' of the flexible film 12 and the first layer of winding shown on FIGURES 1, 2 and 3 with the pair of tubular core members 14, provides sufficient resistance to start the winding of the flexible multi-layer film member 12 therearound in providing the improved capacitor 10. However, applicant has found that a capacitor according to applicant's invention may also be fabricated utilizing a singular tubular core member. Such an arrangement is illustrated on FIGURE 4. As shown on FIGURE 4, a flexible multi-layer film member 63 comprised of alternate layers of a first dielectric layer 64 and a second dielectric layer 68 and a first conducting layer 66 and second conducting layer 70, which may be similar to the arrangement of the flexible film member 12 shown in FIGURES 1, 2 and 3 above, is spirally wound around a single tubular dielectric core member 71. However, to start the winding about the single tubular core member 71, applicant has found it necessary to bond the flexible multi-layer film layer 63 thereon by means of a suitable layer of adhesive 72. This adhesive layer 72 may be of any of the common epoxy adhesives, or any other type of desired member, depending upon the particular type of material utilized for the tubular core member and, for example, the insulating layer 64.

Applicant has found plastic film material upon which a metallic layer has been deposited may be utilized also in the practice of his invention to provide the multi-layer flexible film member. Such a multi-layer flexible film member is illustrated on FIGURE 8. As shown on FIGURE 8, a first dielectric layer 74 is provided with a deposited metallic layer 76 on one face thereof. The layer 76 may, for example, be a metallic layer vacuumed deposited to a thickness on the order of 0.000006 of an inch upon a Mylar substrate comprising the first dielectric layer 74. Suitable masking techniques may be utilized to provide the inwardly spaced edge 76' during the vacuum deposition. The flexible film member 73 is completed by a second dielectric layer 78 upon which a second electrically conductive layer 80 has been vacuum deposited and may, in practice, comprise a strip of the same vacuum deposited conductive layer 76 on the same first dielectric layer 74 but turned end for end so that the inward spacing of the edge 80' of the layer 80 is on a side opposite to that of the inward spacing of the edge 76'. This arrangement of a flexible film member 73 may, of course, be utilized in any of the embodiments of applicant's invention. However, in utilizing such a multi-layer flexible film member with vacuum deposited electrically conductive layers, applicant has found it necessary that the electrical conductive coatings provided along the peripheral edges thereof, as described above in connection with the description of FIGURE 2, is preferably provided by metal spraying rather than solder coating because of the extreme thinness of the electrically conductive layers.

When utilizing metal spraying techniques to provide the electrically conductive layer for joining the peripheral edges of each of the electrically conductive layers to define a first and the second capacitor electrodes, applicant has found it advantageous that the tubular core member or members about which the flexible film member is wound have portions extending beyond the peripheral edges thereof. This is shown in FIGURE 9, where an improved capacitor 80 comprises a flexible multi-layered film member 73 wound around a pair of tubular dielectric core members 82. Portions 82a of each of the tubular core members 82 protrude beyond the peripheral edge 73' of the flexible multi-layered film member 73. The edge 73' may then be metal sprayed to provide a metal sprayed electrically conductive coating 84 thereon and the portions 82a of the tubular members 82 prevent any of the metal spray from inadvertently continuing down the tubular core members 82 and providing electrical shorting between electrodes. After the metallic coating 84 has been sprayed, the extra portions 82a may be suitably removed and capacitor leads inserted thereon to complete the capacitor 80.

This concludes the description of applicant's invention. It will be appreciated that many variations and adaptations may be devised by those skilled in the art. Therefore, the following claims are intended to cover all such variations and adaptations falling within the true scope and spirit of applicant's invention.

I claim:
1. A wound capacitor comprising, in combination:
a pair of tubular dielectric core members having preselected internal diameters;
a multi-layer flexible film member comprising alternate layers of conducting material and dielectric material spirally wound around said pair of core members;
means for electrically connecting a first of said layers of conducting material along a peripheral edge thereof to define therewith a first capacitor electrode;
means for electrically connecting a second of said layers of conducting material along a peripheral edge thereof to define therewith a second capacitor electrode;
a first capacitor lead having a connecting portion inserted in a first preselected end of said pair of core members and having a preselected portion resiliently engaging interior wall portions thereof;
a second capacitor lead having a connecting portion inserted in a second preselected end of said pair of core members and having a preselected portion resiliently engaging interior wall portions thereof;
a first wire means electrically coupled to said first capacitor electrode and to said connecting portion of said first capacitor lead;
and a second wire means electrically coupled to said second capacitor electrode and to said connecting portion of said second capacitor lead.

2. An improved capacitor comprising, in combination:
a flexible dielectric, tubular core member;
a multi-layer film member comprising alternate layers of dielectric material and conducting material tightly wound around said core member and a first of said layers of conducting material comprising a first capacitor electrode and a second of said layers of conducting material comprising a second capacitor electrode;
a first capacitor lead having a connecting portion interior a first end of said core member;

a second capacitor lead having a connecting portion interior a second end of said core member;
a flexible first wire means coupled to said connecting portion of said first capacitor lead and to said first capacitor electrode;
and a flexible second wire means coupled to said connecting portion of said second capacitor lead and to said second capacitor electrode.

3. The arrangement defined in claim 1 wherein said first and said second wire means are welded to said first and said second connecting portions, respectively, of said first and said second capacitor leads, and a solder coat on each of said capacitor leads coupled to said connecting portions of said first and said second capacitor leads and surrounding said welded connections to said first and said second wire means, and said solder coats having a size substantially the same as said preselected internal diameter of said core members.

4. The arrangement defined in claim 1 wherein said layers of dielectric material of said film member comprise tetrafluoroethylene and said layers of conducting material comprise metalized layers vacuum deposited on said layers of tetrafluoroethylene.

5. A wound capacitor comprising, in combination:
a flexible tubular dielectric core member;
a film member comprising alternate layers of conducting material and dielectric material wound around said core member a preselected number of turns;
means for securing a first end of said film member to said core member;
a first capacitor lead having a connecting portion interior a first end of said core member;
a second capacitor lead having a connecting portion interior a second end of said core member;
a flexible first wire means coupled to said connecting portion of said first capacitor lead and to a first of said layers of conducting material;
and a flexible second wire means coupled to said connecting portion of said second capacitor lead and to a second of said layers of conducting material.

6. The arrangement defined in claim 5 wherein said first and said second capacitor leads have a first degree of flexibility and said first and said second wire means have a second degree of flexibility greater than said first degree of flexibility.

7. The arrangement defined in claim 6 wherein said connecting portions of said first and said second capacitor leads are resiliently restrained in said core member by the walls thereof.

8. An improved method of making a wound capacitor of the type having a multi-layer film member, including alternate layers of conductive material and dielectric material in which a first edge of a first half of the layers of conducting material is spaced inwardly a preselected distance from a first edge of said layers of dielectric material and the first edge of the second half of the layers of conductive material is spaced inwardly a preselected distance from a second edge opposite said first edge of said dielectric material, and the second edge of said first half of said layers of conducting material is substantially coextensive with the second edge of said dielectric material and the second edge of said second half of said layers of conducting material is substantially coextensive with said first edge of said dielectric material, comprising the steps of:
spirally winding said film member around a pair of tubular dielectric flexible core members and said core members having portions extending a preselected distance exterior said first edge and said second edge of said layers of dielectric material;
spraying a metallic coating over said second edge of said first half of said layers of conducting material;
spraying a metallic coating over said second edge of said second half of said layers of conducting material;
trimming said core members substantially coplanar with the edges of said layers of dielectric material;

connecting a first wire member to a connecting portion of a first capacitor lead;

connecting a second wire member to a connecting portion of a second capacitor lead;

soldering said first wire member to said metallic coating over said second edge of said first half of said layers of conductive material;

soldering said second wire member to said metallic coating over said second edge of said second half of said layers of conductive material;

and inserting said connecting portions of said first and said second capacitor leads to a preselected distance into said tubular core members.

9. An improved arrangement for connecting capacitor leads to a capacitor of the kind having a flexible multilayer film member, including alternate layers of conducting material and dielectric material spirally wound around at least one flexible tubular dielectric core member comprising, in combination:

a first and a second capacitor lead, each having a preselected connecting portion extending a preselected distance into said at least one core member;

a first flexible wire member coupled to said preselected portion of said first capacitor lead;

a second flexible wire member coupled to said preselected portion of said second capacitor lead;

means for connecting said first wire member to a first of the layers of conducting material;

means for connecting said second wire member to a second of the layers of conducting material;

and said preselected portions of said first and said second capacitor leads yieldingly restrained within said at least one core member by the walls thereof.

10. An improved arrangement for connecting capacitor leads to a capacitor of the kind having a flexible multilayer film member, including alternate layers of conducting material and dielectric material spirally wound around at least one flexible tubular dielectric core member comprising, in combination:

a first capacitor lead having a flattened portion adjacent an end thereof and an aperture through said flattened portion;

a second capacitor lead having a flattened portion adjacent an end thereof and having an aperture through said flattened portion;

a first flexible wire member inserted through said aperture of said first capacitor lead and coupled to a first of said layers of conducting material;

a second flexible wire member inserted through said aperture in said flattened portion of said second capacitor lead and coupled to a second of said layers of conducting material, and said flattened portions of said first and said second capacitor leads contained within said at least one tubular core member and yieldingly restrained therein by the walls thereof.

11. An improved arrangement for connecting capacitor leads to a capacitor of the kind having a flexible multilayer film member, including alternate layers of conducting material and dielectric material spirally wound around at least one flexible tubular dielectric core member comprising, in combination:

a first capacitor lead having a connecting portion extending a preselected distance into a first end of said at least one tubular core member;

a second capacitor lead having a wire connecting portion adjacent an end thereof extending a preselected distance into a second end of said at least one tubular core member;

a first flexible wire member welded to said wire connecting portion of said first capacitor lead and connected to a first of said layers of conducting material;

a second flexible wire member welded to said wire connecting portion of said second capacitor lead and connected to a second of said layers of conducting material;

a solder coat surrounding each of said welds on said wire connecting portions of said first and said second capacitor leads, and said solder coats substantially the size of the inside diameter of said at least one tubular core member.

References Cited by the Examiner

UNITED STATES PATENTS

| | | | |
|---|---|---|---|
| 1,960,944 | 5/1934 | Knudsen | 317—260 |
| 2,958,023 | 10/1960 | Edwards | 317—260 X |
| 3,004,197 | 10/1961 | Rodriguez | 317—260 X |
| 3,156,854 | 11/1964 | Beyer | 317—260 X |
| 3,163,917 | 1/1965 | Bilsing | 317—260 X |

FOREIGN PATENTS

| | | |
|---|---|---|
| 1,062,804 | 4/1954 | France. |
| 357,490 | 3/1930 | Great Britain. |
| 566,492 | 1/1945 | Great Britain. |
| 715,674 | 10/1954 | Great Britain. |

LEWIS H. MYERS, *Primary Examiner.*

JOHN F. BURNS, ROBERT K. SCHAEFER, *Examiners.*

E. GOLDBERG, *Assistant Examiner.*